United States Patent
Almond et al.

(10) Patent No.: US 8,500,033 B2
(45) Date of Patent: Aug. 6, 2013

(54) TRANSPONDER, RFID SYSTEM AND METHODS OF OPERATION

(75) Inventors: Philip John Almond, Redcliffe (NZ); Hendrik Lodewyk Van Eeden, Moreletapark (ZA)

(73) Assignee: Trident RFID Pty Ltd., Brisbane, Queenland (AU)

( * ) Notice: Subject to any disclaimer, the term of this patent is extended or adjusted under 35 U.S.C. 154(b) by 0 days.

(21) Appl. No.: 13/703,507

(22) PCT Filed: Jun. 10, 2011

(86) PCT No.: PCT/NZ2011/000103
§ 371 (c)(1), (2), (4) Date: Feb. 28, 2013

(87) PCT Pub. No.: WO2011/159171
PCT Pub. Date: Dec. 22, 2011

(65) Prior Publication Data
US 2013/0146669 A1    Jun. 13, 2013

(30) Foreign Application Priority Data
Jun. 11, 2010 (NZ) .................................. 586089

(51) Int. Cl.
G06F 17/50 (2006.01)
G08B 13/189 (2006.01)

(52) U.S. Cl.
USPC .................. 235/492; 340/10.1; 340/572.1

(58) Field of Classification Search
USPC .............................. 235/492; 340/10.1, 572.1
See application file for complete search history.

(56) References Cited

U.S. PATENT DOCUMENTS

| | | | |
|---|---|---|---|
| 6,100,788 | A | 8/2000 | Frary |
| 6,223,990 | B1 | 5/2001 | Kamei |
| 7,051,945 | B2 | 5/2006 | Empedocles et al. |
| 7,248,165 | B2 | 7/2007 | Collins et al. |
| 7,446,646 | B2 | 11/2008 | Huomo |
| 7,516,057 | B2 * | 4/2009 | Bridgelall ................ 703/13 |

(Continued)

FOREIGN PATENT DOCUMENTS

| | | |
|---|---|---|
| CN | 201177825 | 1/2009 |
| EP | 0 592 224 | 4/1994 |

(Continued)

OTHER PUBLICATIONS

International Search Report for International Application No. PCT/NZ2011/000103 mailed Dec. 1, 2011.

(Continued)

*Primary Examiner* — Daniel Hess
(74) *Attorney, Agent, or Firm* — Merchant & Gould P.C.

(57) ABSTRACT

A transponder for a radio frequency identification system, the transponder comprising a UHF antenna, an LF antenna, an HF antenna, a charge storing device and an electronic circuit comprising UHF, LF and HF antenna ports; a UHF RFID protocol engine; a DF RFID protocol engine; shared memory for the two protocol engines; a UHF receiver, rectifier and data extractor; an LF receiver, rectifier and data extractor; a UHF modulator; an HF modulator; a decision circuit for selecting either the UHF energy source or the LF energy source; and a digital controller capable of selecting either the UHF protocol engine or the DF protocol engine or both, depending on which energy source is present and the strength of that energy source.

32 Claims, 4 Drawing Sheets

U.S. PATENT DOCUMENTS

| | | | |
|---|---|---|---|
| 8,174,454 B2 * | 5/2012 | Mayer | 343/725 |
| 2004/0089707 A1 | 5/2004 | Cortina et al. | |
| 2004/0185806 A1 | 9/2004 | Van Zyl Smit | |
| 2006/0022800 A1 | 2/2006 | Krishna et al. | |
| 2006/0071756 A1 * | 4/2006 | Steeves | 340/10.1 |
| 2006/0109085 A1 | 5/2006 | Tiernay et al. | |
| 2006/0158316 A1 * | 7/2006 | Eckstein | 340/10.42 |
| 2007/0176755 A1 | 8/2007 | Fischer et al. | |
| 2008/0218344 A1 * | 9/2008 | Lazar | 340/572.1 |
| 2009/0045923 A1 | 2/2009 | Van Eeden | |
| 2009/0066516 A1 | 3/2009 | Lazo | |
| 2011/0068987 A1 * | 3/2011 | Carr | 343/741 |
| 2011/0273273 A1 * | 11/2011 | Liu | 340/10.1 |
| 2011/0285511 A1 * | 11/2011 | Maguire et al. | 340/10.1 |

FOREIGN PATENT DOCUMENTS

| | | |
|---|---|---|
| EP | 0 783 158 | 7/1997 |
| EP | 1 267 303 | 12/2002 |
| EP | 1 393 245 | 3/2006 |
| EP | 1 821 242 | 8/2007 |
| EP | 1 862 945 | 12/2007 |
| EP | 1 927 072 | 1/2012 |
| JP | 8-44831 | 2/1996 |
| WO | WO 98/03938 | 1/1998 |
| WO | WO 2005/073906 | 8/2005 |
| WO | WO 2009/058778 | 5/2009 |

OTHER PUBLICATIONS

Collins. "New Two-Frequency RFID System." *RFID Journal*. http://www.rfidjournal.com/article/view/1105. retrieved Oct. 12, 2012.

Roberti. "NXP Shares Product Roadmap and Application Know-How." *RFID Journal*. http://rfidjournal.com/article/view/5352 retrieved Oct. 12, 2012.

\* cited by examiner

TRANSPONDER, RFID SYSTEM AND METHODS OF OPERATION

This application is a National Stage Application of PCT/NZ2011/000103, filed Jun. 10, 2011, which claims benefit of Ser. No. 586089, filed Jun. 11, 2010 in New Zealand and which applications are incorporated herein by reference. To the extent appropriate, a claim of priority is made to each of the above disclosed applications.

FIELD OF THE INVENTION

This invention relates to a wireless radio frequency identification (RFID) system and more particularly to a transponder forming part of such a system. The invention also relates to a method of operating a transponder of an RFID system.

BACKGROUND

In this specification the term "transponder" is used to describe a device that transmits and/or receives signals.

UHF (Ultra High Frequency) RFID systems are known in which a plurality of RFID transponders are activated by a UHF energizing or interrogation signal from an RFID interrogator. The transponders then transmit response signals to a receiver, which typically form part of an RFID interrogator. The response is achieved by so-called "backscattering", i.e. the transponder reflects varying amounts of the incident UHF power up signal according to the data to be transmitted back to the UHF interrogator by load modulation of its antenna. Examples of such UHF RFID systems are specified in the international ISO/IEC 18000-6 standard. Specifically, RFID transponders and systems complying with the ISO/IEC 18000-6C standard (equivalent to the EPC C1G2 standard) are widely used in supply chain management applications for item identification. One reason for the popularity of UHF RFID is the relatively long reading range (around 10 m) and good anti-collision rate (>100 items per second).

Despite its wide use, UHF RFID suffers from certain drawbacks. Specifically, UHF frequencies are reflected and/or absorbed by various materials and substances, e.g. metals and liquids, resulting in weak or multi-path signal propagation. Reading range is reduced, or items are not successfully identified by nature of them residing in nulls in the UHF energizing field. UHF RFID systems therefore often perform less than satisfactorily when applied to items with high metal or moisture content.

Low frequency (LF) RFID transponders and systems are also known in which the transponders are powered up and respond at low frequencies (e.g. 125 kHz or 134 kHz). Examples can be found in the international ISO/IEC 18000-2 and ISO 11785 standards. LF energizing has an advantage over UHF energizing in that low frequencies are not absorbed and/or reflected by moisture and metals to the same extent as UHF. LF RFID, however, suffers from low response data rates (typically only 2 to 4 kbit/s) and very poor anti-collision rates. Reading range is also low (less than 1 m). LF RFID is therefore usually not suitable for supply chain applications.

High frequency (HF) RFID transponders and systems are also known in which the transponders are powered up and respond at high frequencies (typically 13.56 MHz). Examples can be found in the international ISO/IEC 18000-3, ISO/IEC 14443 and ISO/IEC 15693 standards. HF RFID supports better data and anti-collision rates than LF, but it is still low compared to UHF RFID. HF is also absorbed much more than LF in high moisture environments resulting in low reading range in such environments (typically less than 1 m). With a few exceptions HF RFID is therefore usually not suitable for supply chain applications, especially not in high metal and moisture content environments.

IP-X Dual Frequency or DF RFID is a unique proprietary technology that overcomes the drawbacks of the aforementioned UHF, LF and HF technologies. The transponders are powered at LF (i.e. around 125 kHz), resulting in good power-up range even in high moisture or metal content environments. Response is at HF (typically at 6.78 MHz) at high data rates (typically 128 kbit/s), resulting in anti-collision performance rivaling that of UHF systems. Examples can be found in European patent EP1393245, EP1927072 and EP1862945. In systems where the items to be indentified do contain large amounts of moisture or metal and where read reliability is important, DF RFID systems can compete with UHF RFID.

A subset of supply chain management involves the use of Returnable Transport Items (RTI), such as pallets or plastic crates and totes that need to be tagged with transponders for identification of the RTI during the various stages of the supply chain. RTIs typically move from a service provider that owns and maintains the RTIs to a producer where goods are packed or loaded, then to a distribution centre and finally to retailer, from where it returns empty to the service provider. During its life time an RTI can complete several such round trips, so the actual cost of the transponder becomes less important, since it is effectively reused several times. The main problem is that along this round trip, an RTI can encounter different RFID installations depending on its contents, need for accurate identification and installed infrastructure. Typically at certain points along the chain IP-X DF RFID systems can be in use, while at other points along the chain ISO/IEC 18000-6 UHF systems can be in use.

A transponder that can operate using either an ISO/IEC 18000-6 international standard UHF RFID protocol, or using an IP-X DF protocol, while supplying the same data in both cases, will solve the RTI problem. However, to achieve this is not easy, since UHF RFID and IP-X DF RFID operate at different supply voltages, and have very different memory architectures. Specifically, UHF RFID circuits can operate from supply voltages as low as 1 V, while IP-X DF requires at least 2 V. ISO/IEC 18000-6C uses a segmented memory architecture with 16 bit pages, while IP-X DF uses a flat memory architecture with 64 bit pages. ISO/IEC 18000-6C memory blocks can be read and write protected only at a block level, while IP-X memory can only be write protected, but at a page level.

There are many dual and multi-frequency as well as multi-protocol transponders described in prior art, e.g. U.S. Pat. No. 7,248,165, US2004/0089707, US2009/0066516, US2008/0218344, EP1821242, U.S. Pat. No. 6,223,990, EP0592224, US2009/045923, WO2005073906, EP0783158, US2007/176755, US2006/109085, US2004/185806 and EP1862945. However, none of these give any details as to how such a combination of an ISO/IEC 18000-6 and IP-X DF transponder could be realized or how to overcome the mentioned difficulties of such a combination.

Accordingly, it is an object of the present invention to provide a transponder, an RFID system and a method of operating a transponder allowing identification of RTIs in both IOS/IEC 18000-6 UHF and IP-X DF systems and which alleviates the problem of UHF energy absorption and reflection in ISO 18000-6 UHF RFID systems or which at least provides the public with a useful choice.

SUMMARY OF THE INVENTION

According to one aspect there is provided a transponder for a radio frequency identification system, the transponder comprising a UHF antenna, an LF antenna, an HF antenna, a charge storing device and an electronic circuit comprising:
a. UHF, LF and HF antenna ports;
b. a UHF RFID protocol engine;
c. a DF RFID protocol engine;
d. shared memory for the two protocol engines;
e. a UHF receiver, rectifier and data extractor;
f. an LF receiver, rectifier and data extractor;
g. a UHF modulator;
h. an HF modulator;
i. a decision circuit for selecting either the UHF energy source or the LF energy source; and
j. a digital controller capable of selecting either the UHF protocol engine or the DF protocol engine or both, depending on which energy source is present and the strength of that energy source.

The transponder may be used in a population of transponders in a radio frequency identification system, and may be readable either by an ISO/IEC 18000-6 UHF interrogator or an IP-X DF interrogator or both, while delivering the same data to both kinds of interrogators.

The electronic circuit may contain circuitry to detect the presence of a UHF energizing signal and/or an LF energizing signal. This detector may be capable of detecting the presence of UHF or LF energizing signals at levels below the required level to power up the circuit. In the case where power levels are too low, the transponder may be powered by a battery. The electronic circuit may also contain detector means for detecting and decoding commands transmitted to the transponder by modulation of the UHF or LF energizing field, controller means for executing the relevant air protocols. The controller may implement two protocol engines, one for ISO/IEC 18000-6 and one for IP-X DF and memory means for storing identification and other data.

Upon entering a UHF RFID interrogator field, the transponder may power up from the UHF field by receiving and rectifying the UHF signal, alternatively the transponder may be battery powered. In either case, the UHF detector may detect the presence of a UHF energizing and interrogating field and will respond to such a UHF interrogator according to the protocol used by the interrogator, typically ISO/IEC 18000-6.

Alternatively upon entering an IP-X DF RFID interrogator field, the transponder may power up from the LF field transmitted by the interrogator by receiving and rectifying the LF signal, alternatively the transponder may be battery powered. In either case, the LF detector will detect the presence of an LF energizing and interrogating field and will respond to such an IP-X DF interrogator according to the IP-X DF protocol.

In the case where both a UHF and an DF interrogator is present, the transponder may power up from either the UHF or the LF field or both as before by receiving and rectifying the energizing signals, alternatively the transponder may be battery powered. In all cases, the electronic circuit will detect the presence of both a UHF and an LF energizing and interrogating field and will respond to both such UHF and DF interrogators according to the protocol used by the interrogators.

In order to deliver the same data, whether responding to an ISO/IEC 18000-6 interrogator or an IP-X DF interrogator or both, the memory means may be shared between the two protocol engines. The memory is mapped differently for each of the protocol engines, such that each protocol engine can access the memory according to its own requirements.

It is to be noted that an interrogator or portal may generate both UHF and LF energizing signals, while only detecting either the UHF or HF response or any combination of these.

For example, an ISO/IEC 18000-6C interrogator may be used in conjunction with a LF energizing field. In this case the LF energizing field will only aid in powering the transponder, while the interrogator and transponder need only execute an ISO18000-6C air protocol. Similarly, an IP-X DF interrogator may be used in conjunction with a UHF energizing field. In this case the UHF energizing field will only aid in powering the transponder, while the interrogator and transponder need only execute an IP-X DF air protocol.

It is also to be noted that the interrogators need not send any specific signals or commands for configuring the transponder to energize from either UHF or LF signals, or to respond at UHF or HF. Instead the transponder is intended to be used with any interrogators from any vendors complying with the ISO/IEC 18000-6 international standard or the IP-X DF standard. The transponder automatically detects which kind of interrogator is present and responds accordingly.

According to a further aspect, the present invention provides a transponder configured for use with a plurality of energy source types and further configured to: utilize a plurality of frequency protocol engines, determine the type and/or power of the energy source type that is present, and utilize one or more of the frequency protocol engines based on that determination.

According to yet a further aspect, the present invention provides a method of operating a transponder for use with a plurality of energy source types and utilizing a plurality of frequency protocol engines, wherein the method includes the steps of: determining the type and/or power of the energy source type that is present, and utilizing one or more of the frequency protocol engines based on that determination.

The invention also includes within its scope a method of operating a transponder of a radio frequency identification system comprising an interrogator and a plurality of transponders constituting a transponder population, the method comprising the steps of:
causing the transponder while being exposed to either a UHF or an LF energizing field or both, automatically to power-up from either energizing field and to respond at either UHF or HF or both of these.

BRIEF DESCRIPTION OF THE DRAWINGS

The invention will now further be described, by way of example only, with reference to the accompanying diagrams wherein.

DESCRIPTION OF A PREFERRED EMBODIMENT OF THE INVENTION

The preferred embodiment of the invention consists of a transponder that is capable of being read by an ISO18000-6C UHF RFID interrogator or by an IP-X DF interrogator or both, while delivering the same data to both.

Figure 1:
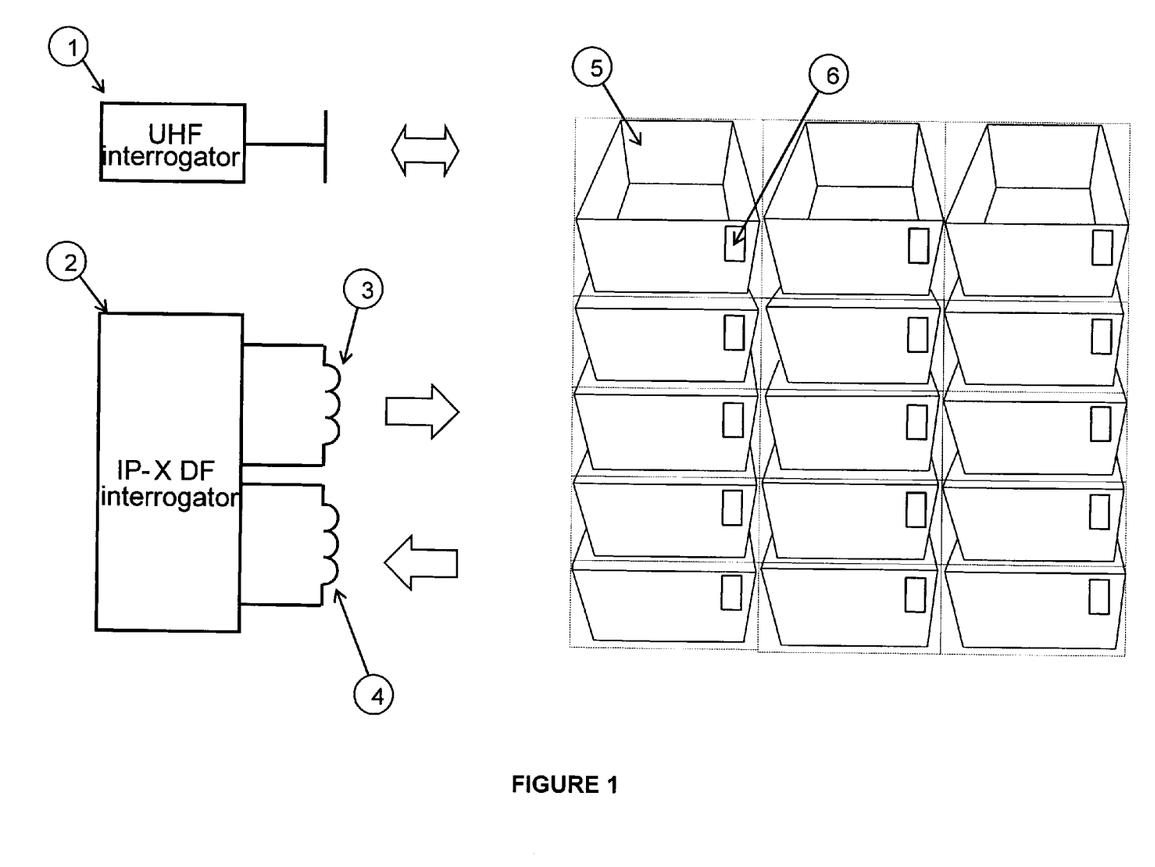
FIG. 1 is a basic block diagram of a combined UHF and DF radio frequency identification system according to the invention.

FIG. 1 shows a diagrammatic representation of a system consisting of a UHF interrogator (1) and an IP-X DF interrogator (2) both interrogating a number of transponders (6) affixed to a number of RTIs (5). The UHF interrogator transmits power and communicates with the transponders bi-directionally through a single mono-static antenna.

The IP-X DF interrogator transmits energy and commands by means of an LF antenna (3) and receives the transponders' response by means of an HF antenna (4).

Figure 2:
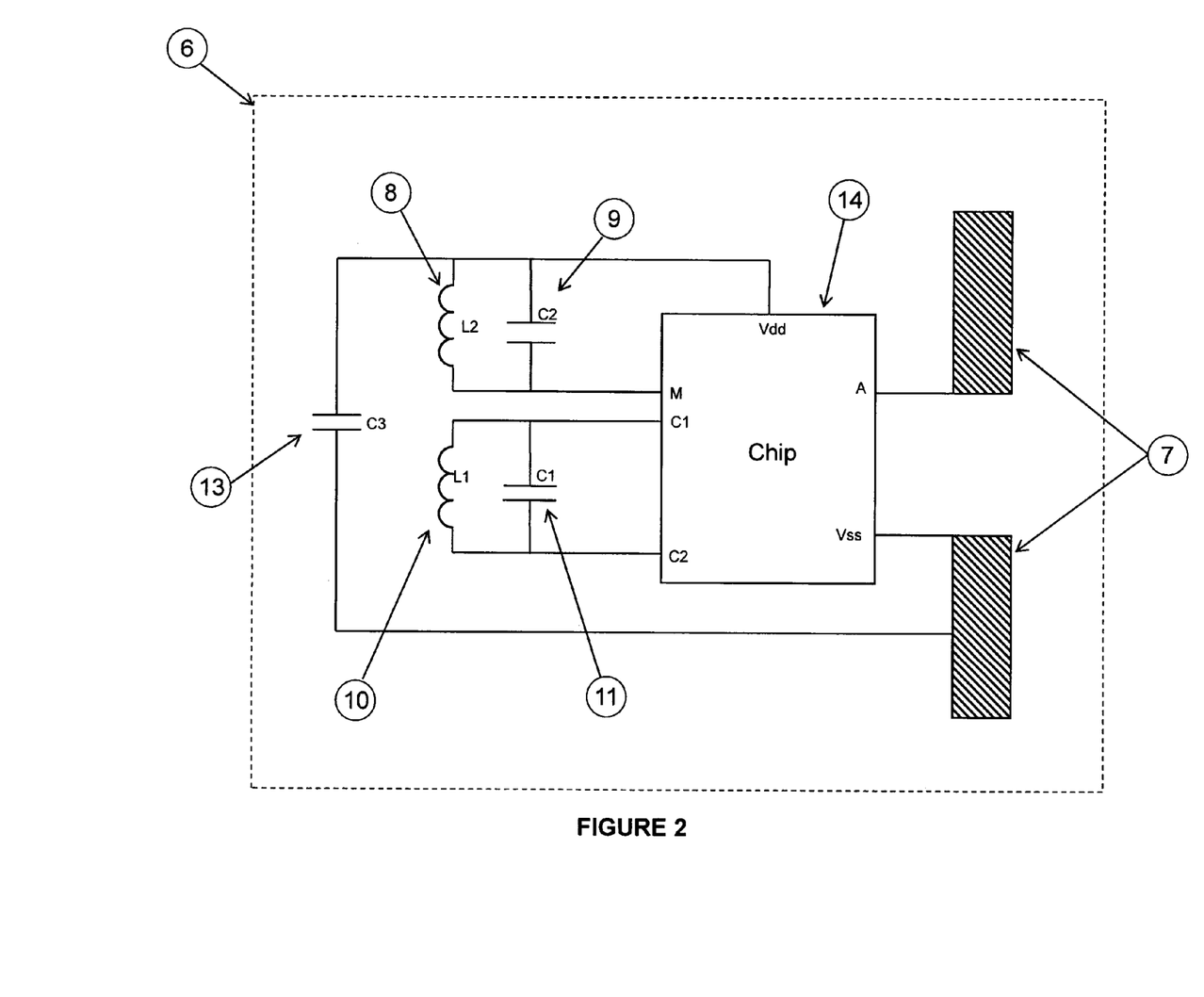
FIG. 2 is a basic block diagram of the transponder according to the invention.
Figure 3:
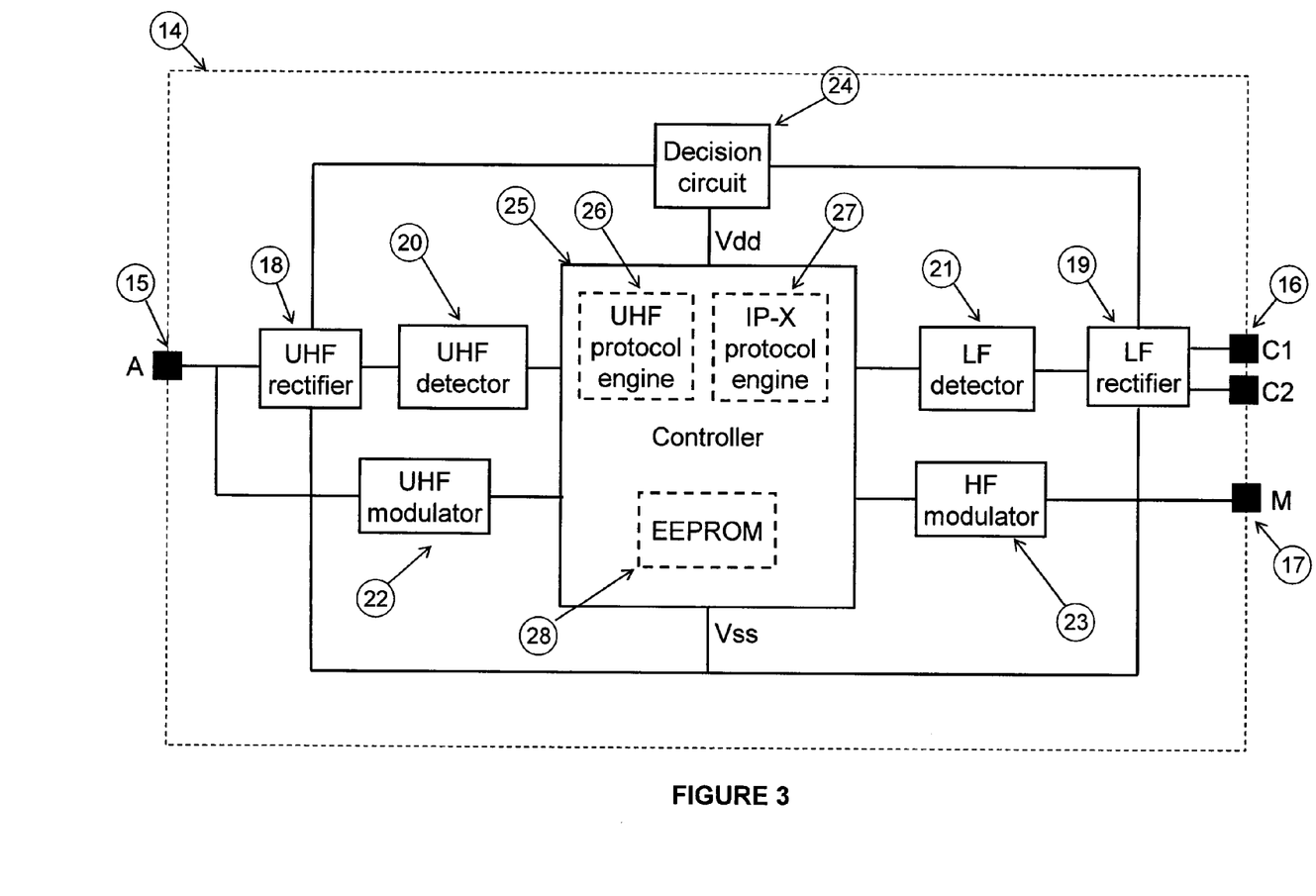
FIG. 3 is a basic block diagram of the electronic circuit according to the invention.

A schematic diagram of the preferred embodiment of the transponder is shown in FIG. 2. The central component of the transponder is an electronic circuit (14), typically implemented in a silicon chip. A diagrammatic representation of the electronic circuit is shown in FIG. 3. The electronic circuit may have connections for positive (Vdd) and negative supply (Vss), a UHF antenna port A (15), an LF antenna port C1 and C2 (16) and a HF antenna port M (17).

A suitable printed or etched UHF antenna (7) is connected between the UHF antenna port and Vss. The antenna would typically be designed to cover the band from 860 MHz to 960 MHz.

A LF coil L1 (10) is connected between C1 and C2. The LF coil typically consist of a large number (e.g. 50-500) turns of copper wire with either an air core or a ferrite core. The LF coil is tuned to resonate at typically 125 kHz by means of a parallel capacitor Cl (11). This capacitor may consist of several parts, namely the self capacitance of the LF coil, an on-chip capacitor implemented inside the silicon chip and a discrete capacitor implemented externally to the chip, or any combination of these three.

An HF coil L2 (8) is connected between the HF port M and Vdd. The HF coil typically consist of a small number (e.g. 1-5) turns of copper wire or etched aluminium with an air core. The HF coil is tuned to resonate at typically 6.78 MHz by means of a parallel capacitor C2 (9).

This capacitor may consist of several parts, namely the self capacitance of the HF coil, an on-chip capacitor implemented inside the silicon chip and a discrete capacitor implemented externally to the chip, or any combination of these three.

Finally the transponder would have a charge storage capacitor C3 (13) connected between Vdd and Vss. This capacitor may also be partly implemented on-chip and partly external to the chip. The main function of the capacitor is to store energy obtained from either the LF or the UHF antenna to be used during HF or UHF response.

The transponder may be constructed in different ways, e.g. the chip and the discrete external components may be mounted on a small printed circuit board (PCB), with the UHF, LF and HF antennas realised separately and connected to the small PCB. Alternatively the UHF and HF antennas could be etched or printed onto the same substrate containing the chip and discrete components, with only the LF antenna realised separately and connected to the main substrate. Finally the complete transponder assembly may be encapsulated e.g. in plastic by injection moulding.

A block diagram of the electronic circuit (14) is shown in FIG. 3. The heart of the electronic circuit is a controller (25) that implements both an ISO 18000-6C protocol engine (26) and an IP-X protocol engine (27). Both protocol engines have access to an EEPROM (28) used to store identification or user data. The followings blocks are peripheral to the controller:

a UHF rectifier (18) that is used to rectify UHF energy received by the UHF antenna. The UHF rectifier is typically implemented as a charge pump.

a UHF detector (20) capable of detecting the level of the UHF signal received as well as detecting commands that may be modulated on the UHF signal.

a UHF modulator (22) for modulating information (ID and/or data) onto the UHF antenna, typically by varying the loading on the UHF antenna.

an LF rectifier (19) that is used to rectify LF energy received by the LF antenna. The LF rectifier is typically implemented as full wave diode or CMOS rectifier.

an LF detector (21) capable of detecting the level of the LF signal received as well as detecting commands that may be modulated on the LF signal.

an HF modulator (23) for modulating information (ID and/or data) onto the HF antenna, typically by pulsing the HF antenna with a short pulses (in the order of 20 ns) causing it to ring at its natural resonant frequency.

A decision circuit (24) that selects the larger of the rectified UHF or rectified LF to be connected to Vdd. This decision circuit also supplies the controller with information as to which one of the UHF or LF rectified signals was selected.

Power-on reset and oscillator(s) (not shown).

Upon entering an energizing field or fields, the decision circuit (24) selects either the rectified UHF or LF to be switched to Vdd, causing the controller to power-up and start to execute its state machine. It is to be appreciated that should only an UHF interrogator be present, only a UHF rectified signal will be present and will be selected to be connected to Vdd. Similarly should only an IP-X DF interrogator be present, only an LF rectified signal will be present and will be selected to be connected to Vdd. In the case where both a UHF and a DF interrogator is present, both a UHF and LF rectified signal will be present and the decision circuit will select the largest to be connected to Vdd.

UHF modulation typically consists of varying the load on the UHF antenna (7). This causes a variation in the strength of the UHF reflection from the transponder that can be detected by the interrogator. Very little energy is dissipated in the UHF antenna, so UHF backscattering and can be done at very low levels of incident UHF energy, i.e. at lower energy levels than is required to power the chip. HF modulation on the other hand is performed by pulsing the HF antenna (8), which is configured as a ringing circuit. Energy is dissipated in the HF antenna and requires sufficient voltage in the form of charge stored on C3 (13) (typically more than 2 V).

When only a UHF energizing signal is present, or when the rectified UHF is larger than the rectified LF, i.e. when the decision circuit (24) selects the rectified UHF, or when the rectified voltage is insufficient for DF response (typically less than 2 V), the controller (25) only executes the UHF air protocol, and only modulates the UHF antenna (7).

When only an LF energizing signal is present, or when the rectified LF is larger than the rectified UHF, i.e. when the decision circuit (24) selects the rectified LF, and when the rectified voltage is sufficient for DF backscatter (typically greater than 2 V), the controller executes both the UHF and DF air protocols, and modulates both the UHF antenna (7) and the HF antenna (8). As said before, the UHF modulation does not consume significant amounts of energy and can be performed at low levels of incident UHF energy, so modulating both antennas does not affect the DF performance significantly.

It is to be appreciated that the value of 2 V used in the description above as a threshold above which HF modulation is possible, is only a typical value. This threshold might have a different value depending on the process and design used. The table below summarises the decision matrix as described above.

| UHF field present? | LF field present? | Selected energising source | > Rectified voltage above DF threshold? | Air protocol to be executed |
|---|---|---|---|---|
| YES | YES | UHF | YES | Both UHF & DF |
|  |  |  | NO | UHF only |
| YES | YES | LF | YES | Both UHF & DF |
|  |  |  | NO | UHF only |
| YES | NO | UHF | YES | UHF only |
|  |  |  | NO | UHF only |
| NO | YES | LF | YES | DF only |
|  |  |  | NO | Neither |

Figure 4:
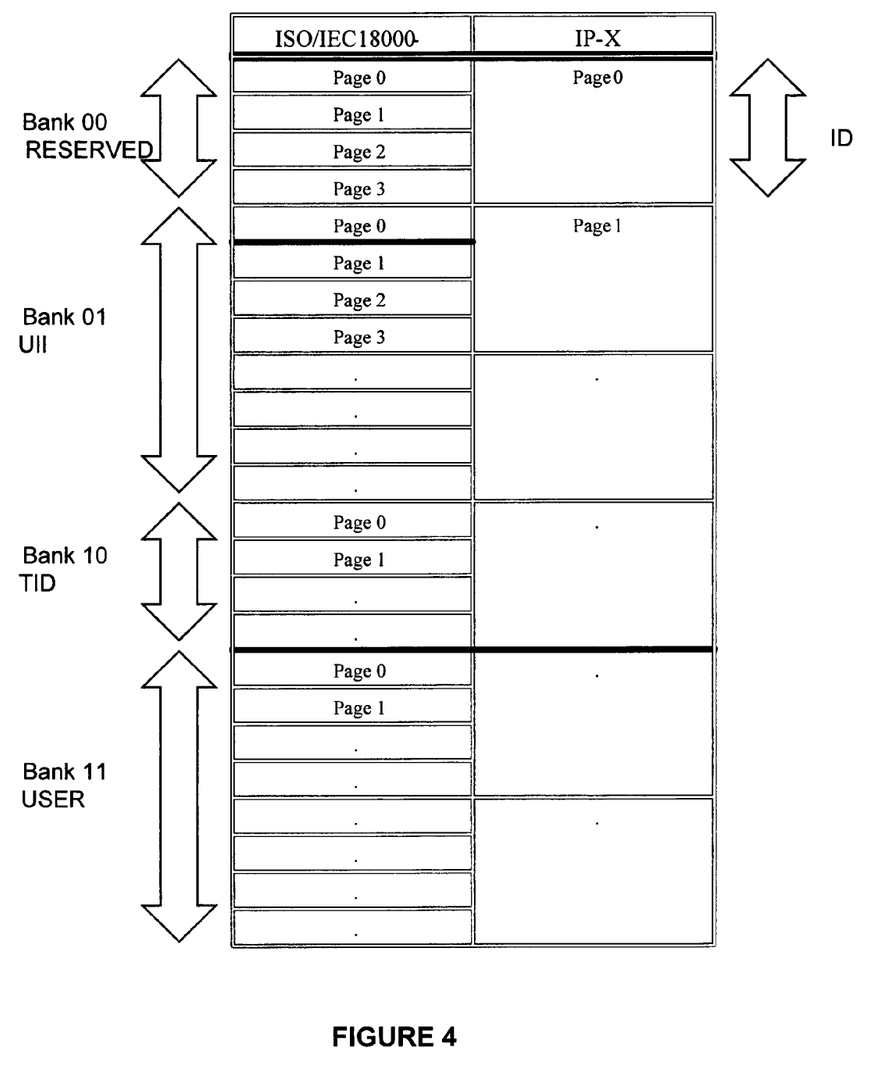
FIG. 4 is a memory map indicating how the memory may be mapped for each protocol engine.

It is an important aspect of this invention that the same data must be delivered to both UHF and IP-X DF interrogators. To achieve this, the EEPROM memory (28) is shared between the two protocol engines (26) and (27). As shown in FIG. 4, this shared memory is mapped differently for the two protocol engines. For an ISO/IEC 18000-6C interrogator the memory must be segmented into four memory blocks (RESERVED, UII, TID and USER), each arranged in pages of 16 bits each. For an IP-X DF interrogator the memory must be mapped as a single block arranged in pages of 64 bits each. In addition the first page (page 0) must be factory programmed and locked with a 64 bit ID number. An ISO 18000-6C transponder delivers the contents of its UII memory (typically and EPC code) during singulation (inventory process), after which additional data from its TID and USER memories may be explicitly read. An IP-X transponder delivers its ID code in page 0, followed by zero or more data pages. This can be configured to be pages mapped to the UII, TID or USER blocks in order to deliver the same data to an interrogator. Additional data pages can also be read explicitly.

ISO/IEC 18000-6C memory blocks can be read and write protected at a block level, while IP-X memory can be write protected at a page level. The controller will have to respect both memory protection schemes, with protection in either scheme overriding a lack of protection in the other scheme. For example, a memory block may be unprotected in the ISO/IEC 18000-6C map, while individual pages may be write protected in the IP-X map. In this case the IP-X write protection must override the lack of protection under ISO/IEC 18000-6C rules, implying that the specific individual pages will not be capable of being written to, while the rest of the memory block will open for writing. Similarly if a memory block is read or write protected under ISO/IEC 18000-6C, then all the pages mapped to that block must be protected under IP-X as well.

ISO18000-6C allows password access to protected memory under certain circumstances. IP-X does not support password access, implying that pages mapped to password protected blocks will not be accessible under IP-X.

The preferred embodiment of the transponder according to the invention also allows for its use in a system that consists of a UHF interrogator that is combined with an LF antenna and transmitter, in which case the LF energy is used to supplement the UHF energy. This could be particularly advantageous in cases where the UHF energy is absorbed or reflected by moisture or metal in the environment.

It is to be noted that, although it is not shown in the preferred embodiment above, whenever there is enough energy for DF backscatter, it is also possible to modulate the LF antenna (10) or otherwise backscatter or transmit information on the LF antenna (10) in the manner that is specified by ISO/IEC 11785, for example.

It will further be appreciated that there are many variations in detail on the electronic circuit, transponder, system and method according to the invention, without departing from the scope and spirit of this disclosure.

The invention claimed is:

1. A transponder for a radio frequency identification system, the transponder comprising a UHF antenna, an LF antenna, an HF antenna, a charge storing device and an electronic circuit comprising:
   a. UHF, LF and HF antenna ports;
   b. a UHF RFID protocol engine;
   c. a DF RFID protocol engine;
   d. shared memory for the two protocol engines;
   e. a UHF receiver, rectifier and data extractor;
   f. an LF receiver, rectifier and data extractor;
   g. a UHF modulator;
   h. an HF modulator;
   i. a decision circuit for selecting either the UHF energy source or the LF energy source; and
   j. a digital controller capable of selecting either the UHF protocol engine or the DF protocol engine or both, depending on which energy source is present and the strength of that energy source.

2. A transponder as claimed in claim 1 wherein the UHF protocol engine is either an ISO/IEC 18000-6C protocol engine or an ISO/IEC 18000-6D protocol engine or both.

3. A transponder as claimed in claim 1 wherein only the UHF protocol is executed when only a UHF energy source is present.

4. A transponder as claimed in claim 1 wherein only the UHF protocol is executed when there is insufficient energy for the DF protocol to be executed.

5. A transponder as claimed in claim 1 wherein both UHF protocol and DF protocols are executed when only an LF energy source is present.

6. A transponder as claimed in claim 1 wherein both UHF and DF protocols are executed when there is sufficient energy for the DF protocol to be executed.

7. A transponder as claimed in claim 1 wherein UHF data and commands can be received and a response backscattered even though the UHF energy level received is too low to power the electronic circuit.

8. A transponder as claimed in claim 1 wherein the LF antenna is only used to receive energy.

9. A transponder as claimed in claim 1 wherein the LF antenna is also used to transmit a response.

10. A transponder as claimed in claim 9 wherein the LF response is according to ISO 11785.

11. A transponder as claimed in claim 1 wherein a battery is used to supply energy to the electronic circuit.

12. A transponder as claimed in claim 11 wherein both UHF and DF protocols are executed when the energy to the electronic circuit is supplied by a battery.

13. A transponder as claimed in claim 11 wherein a battery is switched to supply energy to the electronic circuit only when an LF or UHF energy source is also present.

14. A transponder as claimed in claim 11 wherein a battery is switched to supply energy to the electronic circuit at a duty cycle less than 100%.

15. A transponder as claimed in claim 1 wherein the UHF antenna is in the form of a patch antenna or a dipole antenna or a fractal antenna or a monopole antenna.

16. A transponder as claimed in claim 1 wherein the UHF antenna is realized through etching, printing or plating.

17. A transponder as claimed in claim 1 wherein the LF antenna is in the form of a wire wound coil with an air core or a ferrite core.

18. A transponder as claimed in claim 1 wherein the HF antenna is in the form of a wire wound coil or an etched, printed or plated coil.

19. A transponder as claimed in claim 1 wherein the LF and HF antennas are tuned by means of capacitors external to the electronic circuit, internal to the electronic circuit or both.

20. A transponder as claimed in claim 1 wherein the electronic circuit is a single silicon chip.

21. A transponder as claimed in claim 1 wherein the UHF and HF antennas are realized on the same substrate through etching, printing or plating.

22. A transponder as claimed in claim 1 wherein the electronic circuit, charge storage capacitor and HF and LF tuning elements are realized on one substrate with the antennas connected to the substrate.

23. A transponder as claimed in claim 1 wherein the electronic circuit, charge storage device, UHF antenna and HF and LF tuning elements are realized on one substrate with the HF and LF antennas connected to the substrate.

24. A transponder as claimed in claim 1 wherein the electronic circuit, charge storage device, UHF antenna, HF antenna and HF and LF tuning elements are realized on one substrate with the LF antenna connected to the substrate.

25. A transponder as claimed in claim 1 wherein the charge storing device is a capacitor.

26. A transponder as claimed in claim 1 wherein the DF RFID protocol engine is an IP-X DF RFID protocol engine.

27. A transponder as claimed in claim 1 wherein the memory is mapped such that the same data can be supplied by either protocol engine.

28. A transponder as claimed in claim 27 where the memory protection of either ISO/IEC 18000-6 or IP-X mapping scheme overrides any lack of protection of the other scheme.

29. A transponder as claimed in claim 27 in which the memory can be addressed either in 64 bit or 16 bit pages.

30. A transponder as claimed in claim 27 in which the first 64 memory bits can be mapped either to a factory programmed 64 bit ID or to an ISO18000-6C Reserved memory bank.

31. A transponder as claimed in claim 27 in which the memory bits 64 to 80 can be mapped either to a CRC that is calculated on the fly or to a programmed CRC.

32. An RFID system comprising a transponder as claimed in claim 1.

* * * * *